United States Patent
Jorgensen et al.

(10) Patent No.: US 10,043,137 B1
(45) Date of Patent: Aug. 7, 2018

(54) DYNAMICALLY OPTIMIZED TRANSPORT SYSTEM

(71) Applicant: Rev Software, Inc., San Jose, CA (US)

(72) Inventors: Jacob W. Jorgensen, Folsom, CA (US); Thomas Garett Kavanagh, San Jose, CA (US); Jagadishchandra Sarnaik, San Jose, CA (US); Akhil Shashidhar, Santa Clara, CA (US); Sreenivasa R. Tellakula, San Jose, CA (US); Jonathan Bosanac, West Hollywood, CA (US)

(73) Assignee: NUU:BIT, INC., San Jose, CA (US)

( * ) Notice: Subject to any disclaimer, the term of this patent is extended or adjusted under 35 U.S.C. 154(b) by 486 days.

(21) Appl. No.: 14/589,896

(22) Filed: Jan. 5, 2015

Related U.S. Application Data

(60) Provisional application No. 61/924,183, filed on Jan. 6, 2014.

(51) Int. Cl.
  *H04L 29/06* (2006.01)
  *G06N 99/00* (2010.01)
  *G06F 17/30* (2006.01)

(52) U.S. Cl.
  CPC ..... *G06N 99/005* (2013.01); *G06F 17/30864* (2013.01); *H04L 69/16* (2013.01)

(58) Field of Classification Search
  CPC .. G06N 99/005; G06F 17/30864; H04L 69/16
  See application file for complete search history.

(56) References Cited

U.S. PATENT DOCUMENTS

| | | | |
|---|---|---|---|
| 6,839,562 B2 | 1/2005 | Smith et al. | |
| 7,020,083 B2 * | 3/2006 | Garcia-Luna-Aceves | H04L 1/1832 370/229 |
| 7,096,274 B1 * | 8/2006 | Ci | H04L 1/0007 370/333 |
| 8,185,617 B1 | 5/2012 | Mukerji | |
| 8,775,109 B2 | 7/2014 | Curt | |
| 9,037,638 B1 | 5/2015 | Lepeska | |
| 2002/0150048 A1 | 10/2002 | Ha et al. | |
| 2005/0013287 A1 | 1/2005 | Wallentin | |

(Continued)

*Primary Examiner* — Christian P Chace
*Assistant Examiner* — Tsu-Chang Lee
(74) *Attorney, Agent, or Firm* — Haverstock & Owerns LLP

(57) ABSTRACT

A congestion control mechanism is described that is specifically designed to enhance the operation of TCP communication sessions for the delivery of web content. The congestion control mechanism dynamically adjusts the size of the congestion window in a manner that maximizes the speed of content delivery for web page requests in a cellular network. The dynamic window size adjustments, including the initial congestion control window size, are adaptive, changing as cellular network conditions change, and in a manner that is not possible with conventional TCP congestion control mechanisms that were not explicitly designed to accelerate content in cellular networks. The congestion control mechanism also learns from previous experience with a particular end user device address and network, and applies its learning to set its initial values and subsequent behavior to more optimal levels for the particular end user device and network.

4 Claims, 9 Drawing Sheets

(56) References Cited

U.S. PATENT DOCUMENTS

| | | |
|---|---|---|
| 2008/0034198 A1 | 2/2008 | He et al. |
| 2009/0144398 A1 | 6/2009 | Reisman |
| 2009/0303888 A1* | 12/2009 | Ariyur ................ H04L 41/0816 370/252 |
| 2010/0058147 A1* | 3/2010 | Seferoglu ............. H04L 1/0009 714/776 |
| 2012/0066586 A1 | 3/2012 | Shemesh |
| 2012/0106852 A1 | 3/2012 | Khawand |
| 2012/0278431 A1 | 11/2012 | Luna |
| 2013/0167181 A1 | 6/2013 | Dixit et al. |
| 2013/0311643 A1 | 11/2013 | Kulkarni |
| 2013/0322242 A1 | 12/2013 | Swenson et al. |
| 2014/0022904 A1 | 1/2014 | Ahmad et al. |
| 2014/0119184 A1 | 5/2014 | Harrang et al. |
| 2014/0164641 A1 | 6/2014 | Ye et al. |
| 2016/0294714 A1* | 10/2016 | Persson ................... H04L 47/12 |
| 2016/0359684 A1 | 12/2016 | Rizqi et al. |

* cited by examiner

| DOTS Mechanisms that Address Adverse Cellular Network/Device Conditions | | | | | | | | |
|---|---|---|---|---|---|---|---|---|
| | DOTS TCP Mechanisms (DOTS Congestion Control Algorithm) | | | | | DOTS Session DB (DOTS Learning Machine) | | |
| | DOTS Packet Pacing | DOTS Proactive Congestion Control | DOTS Bandwidth Estimation | DOTS Leaky Bucket Pacing | DOTS Initial Window Control | Prior DOTS Experience | DOTS IP Address Mapping Function | DOTS Network and Device Profile DB |
| Buffer Bloat | ✓ | ✓ | ✓ | ✓ | | ✓ | ✓ | ✓ |
| Network Bandwidth Asymmetry | ✓ | ✓ | ✓ | ✓ | | ✓ | ✓ | ✓ |
| Performance Enhancing Proxies | ✓ | ✓ | ✓ | ✓ | ✓ | ✓ | ✓ | ✓ |
| Network Traffic Shapers | ✓ | ✓ | ✓ | ✓ | ✓ | ✓ | ✓ | ✓ |
| Radio Resource Controller Delays | ✓ | ✓ | | ✓ | ✓ | ✓ | | |
| MAC Layer Latencies | ✓ | ✓ | ✓ | ✓ | ✓ | | | ✓ |
| Cell Handoff Delays | ✓ | ✓ | | ✓ | ✓ | | | ✓ |
| Dynamic Network Conditions | ✓ | ✓ | ✓ | ✓ | ✓ | | | |
| Bursty HTTP Traffic | ✓ | ✓ | | | ✓ | | | |
| Cellular Network Technology | ✓ | ✓ | ✓ | ✓ | ✓ | ✓ | ✓ | ✓ |
| Cellular Network Carrier Identity | ✓ | ✓ | ✓ | ✓ | ✓ | ✓ | ✓ | ✓ |
| User Device Receive Buffer Size | ✓ | ✓ | | ✓ | ✓ | ✓ | ✓ | ✓ |
| User Device Processor Speed | ✓ | ✓ | | ✓ | | ✓ | ✓ | ✓ |
| User Device Browser/App Type | ✓ | ✓ | | ✓ | | ✓ | ✓ | ✓ |
| Network RTT/Latency Volatility | ✓ | ✓ | ✓ | ✓ | ✓ | | | |

Fig. 2

DYNAMICALLY OPTIMIZED TRANSPORT SYSTEM

CROSS-REFERENCE TO RELATED APPLICATION(S)

This application claims priority under 35 U.S.C. § 119(e) of the U.S. Provisional Patent Application Ser. No. 61/924,183, filed Jan. 6, 2014 and titled, "OVERVIEW OF THE REV SOFTWARE TECHNOLOGY AND PRODUCT— OPTIMIZING THE DELIVERY OF WEB CONTENT TO WIRELESS USERS" which is also hereby incorporated by reference in its entirety for all purposes.

FIELD OF THE INVENTION

The present invention relates to the field of the delivery of web content to wireless users.

BACKGROUND OF THE INVENTION

As the Internet has grown in scope and size over the past twenty years, there has been a corresponding exponential growth in the number of web sites and web users. As these web sites have proliferated in number, size and complexity, web site performance has become an important issue. Today's web sites are considerably larger and more complex than those that emerged 20 years ago, which has exacerbated the performance issue. Due to the need for improved performance, technology improvements have emerged to address this problem. For the most part, web performance has been able to keep pace with user demand. However, these technologies have focused on the wired desktop environment, which historically reflected the environment of most conventional users. Recently, however, the amount of web traffic to mobile users has grown to surpass that of desktop users.

Current approaches to speeding up the delivery of web content to end users have been primarily focused on conventional wired networks and attempt to improve the speed of delivery by simply relocating as much of the web content as possible closer to the end user through the use of Content Delivery Networks, or CDNs. With incremental improvements in network technology such as cloud storage and computing, content caching, and Domain Name Services (DNS), the speed of delivery has steadily improved. These approaches have succeeded in accelerating web content delivery from the web origin by caching a significant portion of web content at the Internet edge. By delivering web content to the user from the edge, rather than from the web origin site, the propagation delay has been significantly shortened. As propagation delay may be the major contributor to latency, typically this means bypassing 30 to 80 milliseconds of delay. For end user devices with wired connectivity, the approach is able to reduce web content delays by 80% or more. However, for mobile end user devices such as smart phones or tablet devices connected to the Internet via a wireless cellular network connection, the previously described wired propagation delay may represent only a fraction of the total content delay, because delay through the cellular network is able to be several times the delay seen in the wired portion of the connection.

Previous approaches have not addressed the problem of content delivery speed over mobile cellular networks. Because cellular networks are significantly different in structure and design from wired networks, they present new complexities and obstacles that have not been addressed by these conventional approaches. Latencies that are generated inside the cellular network cannot be addressed by simply moving content closer to the edge, especially when the cellular network latency is able to be several multiples of the propagation delay that exists from the web site origin to the edge.

SUMMARY OF THE INVENTION

In order to address the challenge of accelerating web and web app content delivery to wireless devices in a cellular network, a congestion control mechanism is described that is specifically designed to enhance the operation of TCP communication sessions for the delivery of web content, in both wired and wireless environments, but in particular, addresses the unique challenges of a typical cellular network. The congestion control mechanism dynamically adjusts the size of the congestion window in a manner that maximizes the speed of content delivery for web page requests in a cellular network. The dynamic window size adjustments, including the initial congestion control window size, are adaptive, changing as cellular network conditions change, and in a manner that is not possible with conventional TCP congestion control mechanisms that were not explicitly designed to accelerate content in cellular networks. The congestion control mechanism also learns from previous experience with a particular end user device address and network, and applies its learning to set its initial values and subsequent behavior to more optimal levels for the particular end user device and network. The congestion control mechanism will also respond to unexpected adverse network conditions that cause packet loss, by rapidly stepping back its flow rates. By utilizing the new congestion control mechanism in a proxy device at the Internet edge, web content delivery is significantly accelerated without the need for specialized software in the end user's mobile device. Because the new congestion control mechanism is perfectly compatible with the operation of previous TCP software, the pre-existing TCP/IP network software in the end user device is sufficient to allow the new Dynamically Optimized Transport System (DOTS) congestion control mechanism to operate in an "asymmetric" manner, with the web content delivery being accelerated to the end user device, but without any acceleration of data traffic from the end user device to the TCP sender managing content flow from the web page origin or the Internet edge.

In an additional embodiment, having a software agent (as generated from a Software Development Kit (SDK)) on the end user device will allow faster content delivery in the down link direction. The SDK has several functions, the primary being to provide a platform for two newly designed data communications stacks that are based on UDP and TCP, collectively named Rev Mobile Protocol (RMP), which are specifically designed to optimize web content flow to and from the end user device, which is able to be a smart phone, a tablet, or a laptop with a cellular network interface capability.

In one aspect, a method of executing flow control of a communications session over a network for acceleration of web content to mobile devices comprises optimizing a communication for HTTP operation by allowing bursty HTTP flow characteristics and communicating data using the optimized communication. Allowing bursty HTTP flow characteristics includes utilizing a bursty profile for a root object and maintaining the bursty profile for additional objects. Optimizing the communication for HTTP operation includes adapting to changing network conditions in a mobile network data path and a client device. The network conditions include information related to wireless network type, carrier, geography, client type, latency and bandwidth. In some embodiments, the method is implemented using cloud-based technology. Optimizing the communication for HTTP operation includes learning from previous experience with a client device and the network. Optimizing the communication for HTTP operation includes having an adaptable initial congestion window, slow start threshold values, adaptable congestion control algorithms, selectable pacing levels, and traffic contour enhancements.

In another aspect, a method of executing congestion control of a communications session over a network, for acceleration of web content to mobile devices comprises optimizing a communication for HTTP operation by allowing bursty HTTP flow characteristics, including dynamically adjusting a size of a congestion window in a network using a congestion control mechanism and communicating data using the optimized communication. Dynamically adjusting the size of the congestion window includes adjusting an initial congestion control window size. Dynamically adjusting the size of the congestion window changes as conditions of the network change. The congestion control mechanism learns from previous experience with a particular end user device and the network. In some embodiments, the method is implemented on a cellular network. In some embodiments, the method is implemented on a wired network.

In another aspect, a method of applying previous experience with a specific connection in order to set appropriate parameters governing the behavior of a TCP-type connection comprises generating and maintaining a session database of devices and networks that records specific device and network characteristics and performance responses in dynamically optimized transport system sessions and generating and using a congestion control learning machine that uses prior session records in the session database to set a most optimal dynamically optimized transport system web content delivery flow rate to a specific mobile end user device and cellular network by analyzing the prior session records in order to derive the most optimal dynamically optimized transport system web content delivery flow rate to the specific mobile end user device and the cellular network by dynamically setting an initial congestion window and setting transport rate backoff levels to be used as a function of subsequent retransmission events. The method further comprises initiating a new connection with a server including obtaining a connection record, moving a record from a free container to a connection list, using existing client records to determine a back-off level for a current client and calculating a client receive window and an initial congestion window. The method further comprises closing a connection with a server including removing a connection record from a connection list, and if a client record already exists for the client then the connection record is returned to a free container; otherwise, the connection record is transitioned into the client record and added to the client list.

In another aspect, an apparatus comprises a non-transitory memory for storing an application, the application configured for executing flow control of a communications session over a network for acceleration of web content to mobile devices including: optimizing a communication for HTTP operation by allowing bursty HTTP flow characteristics and communicating data using the optimized communication and a processing component coupled to the memory, the processing component configured for processing the application. Allowing bursty HTTP flow characteristics includes utilizing a bursty profile for a root object and maintaining the bursty profile for additional objects. Optimizing the communication for HTTP operation includes adapting to changing network conditions in a mobile network data path and a client device. The network conditions include information related to wireless network type, carrier, geography, client type, latency and bandwidth. In some embodiments, the device is implemented using cloud-based technology. Optimizing the communication for HTTP operation includes learning from previous experience with a client device and the network. Optimizing the communication for HTTP operation includes having an adaptable initial congestion window, slow start threshold values, adaptable congestion control algorithms, selectable pacing levels, and traffic contour enhancements.

In another aspect, an apparatus comprises a non-transitory memory for storing an application, the application configured for executing congestion control of a communications session over a network, for acceleration of web content to mobile devices including: optimizing a communication for HTTP operation by allowing bursty HTTP flow characteristics, including dynamically adjusting a size of a congestion window in a network using a congestion control mechanism and communicating data using the optimized communication and a processing component coupled to the memory, the processing component configured for processing the application. Dynamically adjusting the size of the congestion window includes adjusting an initial congestion control window size. Dynamically adjusting the size of the congestion window changes as conditions of the network change. The congestion control mechanism learns from previous experience with a particular end user device and the network. In some embodiments, the apparatus is implemented using a cellular network. In some embodiments, the apparatus is implemented using a wired network.

In yet another aspect, an apparatus comprises a non-transitory memory for storing an application, the application configure for applying previous experience with a specific connection in order to set appropriate parameters governing the behavior of a TCP-type connection including: generating and maintaining a session database of devices and networks that records specific device and network characteristics and performance responses in dynamically optimized transport system sessions and generating and using a congestion control learning machine that uses prior session records in the session database to set a most optimal dynamically optimized transport system web content delivery flow rate to a specific mobile end user device and cellular network by analyzing the prior session records in order to derive the most optimal dynamically optimized transport system web content delivery flow rate to the specific mobile end user device and the cellular network by dynamically setting an initial congestion window and setting transport rate backoff levels to be used as a function of subsequent retransmission events and a processing component coupled to the memory, the processing component configured for processing the application. The application further configured for initiating a new connection with a server including obtaining a connection record, moving a record from a free container to a connection list, using existing client records to determine a back-off level for a current client and calculating a client receive window and an initial congestion window. The application further configured for closing a connection with a server including removing a connection record from a connection list, and if a client record already exists for the client then the connection record is returned to a free container; otherwise, the connection record is transitioned into the client record and added to the client list.

BRIEF DESCRIPTION OF THE DRAWINGS

FIG. 2 illustrates a chart of DOTS functions addressing adverse network and device conditions.

DETAILED DESCRIPTION OF THE PREFERRED EMBODIMENT

Figure 1:
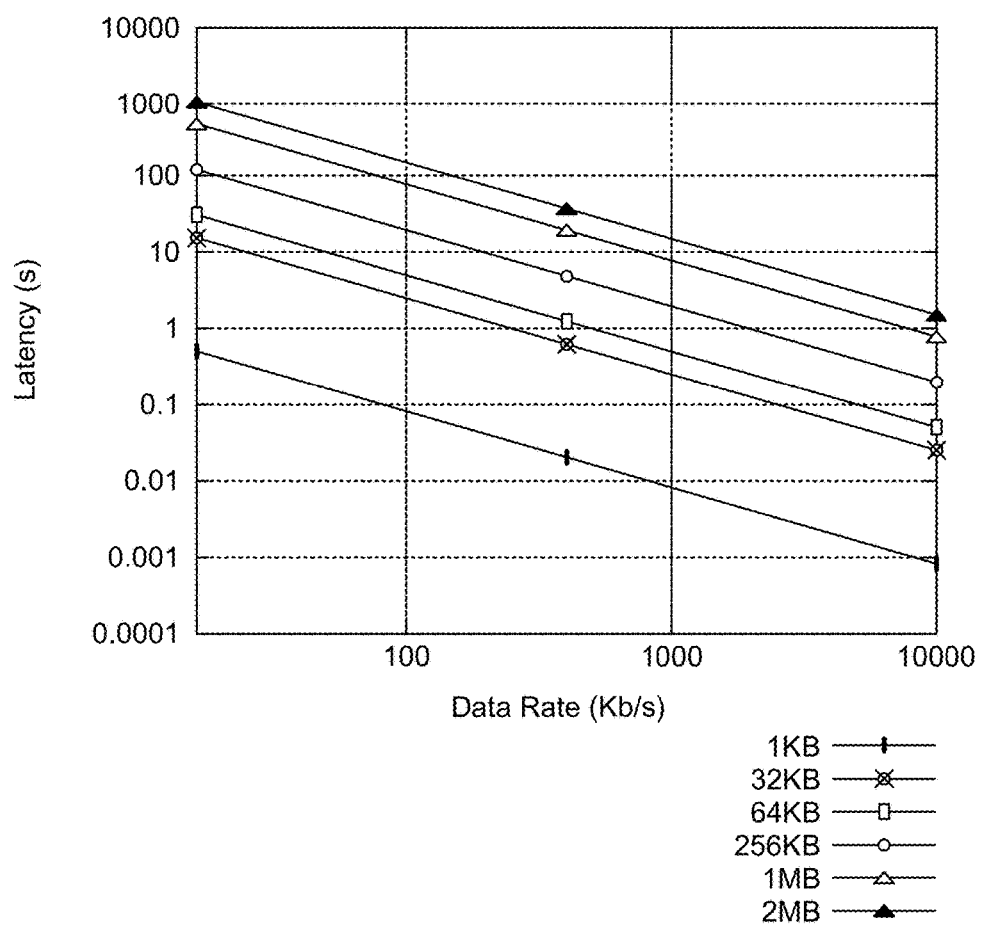
FIG. 1 illustrates a graph of latency due to queuing delay experienced by data in fully congested queues (buffer bloat) of various sizes.

With a new approach, a new congestion control mechanism is purpose-built to address the problem of web content acceleration over cellular networks. The new mechanism is intended to accelerate web content through a cellular network, developed specifically to overcome the obstacles presented by cellular networks. These new protocols and optimizations are dynamic and adaptive because of the rapidly changing network conditions present in the mobile network.

In order to address the problem of accelerating mobile content delivery, an entirely new approach is utilized—one that stands apart from the present wired network solutions. The approach utilizes an understanding of end-to-end network behavior over a combined wired and wireless network plus detailed knowledge of the inner workings of the cellular network. By applying this understanding, a new data acceleration technology has been developed with deep roots in both the wired and the wireless worlds, resulting in a solution that provides significant performance improvements in both realms.

Network traffic is controlled by TCP, which meters the flow of data from one location to another through the use of several different mechanisms. An important mechanism is the TCP congestion control algorithm, which operates in every conventional TCP variant. These TCP variants make assumptions about the nature of the network, and the causes of network performance impediments. In order to detect these impediments, the TCP variants sense, or measure, different quantities in real time in order to properly control the flow rate of data. There are several different versions of the TCP congestion control algorithm, which utilize various sources of information about network flow conditions. These sources fall into two main classes—loss based algorithms and delay-based algorithms. Given the unique complexities of the cellular network environment, the use of either type of algorithm will lead to non-optimal network performance. Many of the assumptions underlying the design of these congestion control algorithms are not applicable to cellular network environments. As one example, the receipt of signals meant to indicate packet loss may cause TCP to retransmit packets. However, the link layer of the cellular radio itself may trigger the re-transmission of buffered packets that have been lost while in transit over the air, thereby obviating the need for TCP to re-transmit.

One of the challenges to designing a TCP congestion control (CC) mechanism better suited to the cellular network environment is to ensure that the CC mechanism does not adversely affect the pre-existing TCP flow control mechanism so that the TCP governed flow rate continues to provide optimal content flow to the end user device by not starving the end user device or by flooding the end user device with content data.

The primary protocol used for the transfer of web content is HTTP (and HTTPS), and the system described herein specifically speeds the transport of web content by TCP in a manner that recognizes the protocols, mechanics and timing constraints of web page content downloading, and the specific characteristics of HTTP. An important aspect of HTTP operation is the use of the SPDY protocol originally introduced by Google®, which provides a binary framing layer that enables request and response multiplexing, and is a concept now supported by the HTTP 2.0 specification. In order to more optimally support efficient bandwidth utilization and improve content delivery times for multiplexed SPDY content, TCP's operation should be aware of the multiplexed HTTP streams and operate in a manner that best accelerates their operation.

The system described herein incorporates the intrinsic structure of a typical web page and the manner in which the individual components of a typical web page are transported by HTTP over TCP. As an example, a root object is usually the first structure that is transported to the end user's web browser, and subsequent objects are transported as needed by the root object, or by the web browser. The nature of web content transport, then, is best characterized as "bursty", with the root object transported first, and subsequent objects transported as specified by the root object or the user's web browser. The bursty traffic flow is able to be seen to be distinct from other types of flows such as file downloads, video streaming, or multi-media content transport, where the flow is better characterized as continuous or smooth, rather than bursty. Previous versions of TCP have been developed to optimize data transport that belongs to the second group of flows, which are continuous in nature. The congestion control mechanisms were developed in a manner to maximize the rate of data transfer in a data channel. By sensing delay or loss, these congestion control mechanisms act in a "fair" manner, allowing all continuous flows to share the available bandwidth in a fair manner.

The concept of bandwidth fairness has been used as a guiding principle of design for TCP congestion control mechanisms, so that no single user is able to utilize a disproportionate amount of available bandwidth. This principle addresses the need for the equitable distribution of network bandwidth when the preponderance of TCP flows were attributable to functions such as file transfers and other applications where relatively continuous data flows were required. With the now dominant network application of web page access, data flows are much less continuous, and instead are bursty in nature, because of the normal operation of the higher layer protocol HTTP, responsible for the encoding and transfer of web content. With the bursty form of content transport characteristic of web content transport, TCP should operate in a manner that is not optimally supported by the prior congestion control mechanisms that were designed for more continuous data flows. Allowing an initial burst of traffic that carries the web page root object, followed by subsequent bursts for other web page objects, permits the web page to be downloaded and rendered by the browser more rapidly than a conventional continuous flow of content, which provides a form of "traffic shaping" to the initial burst because of the slow-start nature of conventional TCP congestion control mechanisms, which then increase slowly over time. Because the root object is usually fairly small, conventional TCP may not have increased its flow rate substantially during its slow start phase by the time the entire root object has been delivered. The end result is that the root object, the most bottlenecked object for subsequent web page construction, is delivered slowly.

By operating in a manner that is more responsive to the bursty flow requirements of web content flow generated by HTTP, the system described herein is able to significantly accelerate the delivery of web content to the mobile end user, or even a wired desktop end user.

Challenge of Wired vs. Mobile Content Delivery

Along with the growth of the Internet and number of users, cellular networks have also experienced dramatic growth. Many of the improvements to web site performance brought by technology innovations, such as Content Distribution Networks (CDN), Dynamic Site Acceleration (DSA) and HTML protocol advances have helped to mitigate the web performance problems experienced by users. With the use of object caching, image compression, and other methods to speed content delivery and reduce network round trips, CDNs are able to significantly reduce page load times for wired (non-mobile) users. Unfortunately, the performance of web sites as accessed from mobile devices has always lagged behind that of wired, desktop web access. Much of the performance improvement brought on by these recent technology innovations has not been effective in improving performance for mobile web users.

Limitation of Edge Caching for Mobile Content

CDNs primarily address the problem that the simple geographic distance between the user and the web site causes delays that become more significant with the increase of the number of data transfer trips to complete the transfer of all content to a web page. Typically, once a user accesses a web site, the contents of the web site cause many successive downloads in response to HTTP GET commands sent by the end user device or program. In part, this is due to the amount of data required, which necessitates numerous download trips, and due to required interaction between the user's browser or application and the web site itself. Each download of content is limited by the propagation delay of the network signals being some fraction of the speed of light, and the distance from the web site to the device.

By distributing web content at the network edge, and therefore closer to the wired end user, the most significant sources of delay have been addressed. Rather than addressing transport speed inefficiencies, simply reducing the distance of the network transmission will provide a reduction in content delivery time. However, for mobile users, the transfer of content to the network edge is only a part of the overall delay. From the network edge to the mobile user, the content traverses the cellular network. The delay through a cellular network is usually the largest component of the sum of all delays experienced by the transfer of web content from the origin web server to the end user's mobile device. For the delay through this portion of the route, CDNs are able to be of no further help, because they have already moved content to the network edge, which is as close to the mobile device as possible.

Cellular 4G-LTE Performance Challenges

Although the technology of cellular networks has been dramatically improving over the past 20 years, progressing from 2G to 2.5G, to 3G, and now with the rollout of 4G-LTE, the general latency of web access as experienced by mobile device users has not seemed to improve in a meaningful way. While cellular network operators claim that user bandwidth has been increased in 4G-LTE, there are some suggestions that in many cases the latency has actually increased. Many analysts have concluded that these cellular networks are congested, resulting in high latencies and low bandwidth availability. Yet, there is available and unused bandwidth in most cellular networks, even while being congested, due to inefficiencies of conventional TCP and peculiarities of the cellular network as described in part in the following sections. A properly designed networking protocol that is able to adaptively and intelligently navigate through the network and utilize the unused bandwidth is beneficial.

Cellular networks not only have significantly more latency, their latencies are also highly variable, with time constants and rates of change that are greater and different in behavior than wired networks. Their higher latency, lower available bandwidth, and higher variability are caused by a combination of factors that are intrinsic to the design and operation of cellular networks. Any attempt to provide improved web performance through such networks involves a deep understanding of the inner characteristics of these networks. So far, the application of existing wired DSA and CDN solutions to mobile networks has not improved content delivery performance, because they fail to address these complex sources of latency within the cellular network.

The major sources of delay or latency in cellular networks are primarily due to reasons other than propagation delay. For cellular networks, network characteristics (bandwidth, latency, packet loss, device diversity) are able to vary based on the identity of the cellular network operator, the technology generation of the cellular network technology, the user service level and the device type, the operating system and browser type, and the specific manner in which the mobile network is provisioned. Servers and devices in the data packet pathway of the mobile network (mobile backhaul, mobile packet core, firewalls, network address translation boxes, transparent proxies) each contributes differently to overall network characteristics.

Therefore, in order to address the problem of accelerating mobile content delivery, an entirely new approach is utilized—one that stands apart from the present wired network solutions. The approach involves an understanding of end-to-end network behavior over a combined wired and wireless network, and the inner workings of the cellular network. By applying this understanding, a data acceleration technology has been developed with deep roots in both the wired and the wireless worlds, resulting in a solution that provides significant performance improvements in both realms.

Cellular Radio MAC Latencies

The characterization of data transfer in a mobile network as it relates to web page performance is a multi-dimensional problem. The air interface, the medium access control (MAC) layer, which is the radio transmission protocol between the base station and the mobile device, is a key contributor to characteristics such as latency, packet loss, and congestion. Because of the highly dynamic nature of radio transmission, data packets are queued in a server associated with the cellular radio transmitter in a periodic manner, waiting for the transmission cycles of the radio MAC layer which controls when the packets are transmitted over the radio medium. Radio conditions are constantly changing, and mobile devices use time to transition their radios to active status, so data packets may be queued for unpredictable lengths of time. When a mobile user transfers from one cellular zone to another, a radio handoff occurs, which may also add latency. Device queues have been designed to be large enough so that no packets are unintentionally discarded while waiting for the next transmission cycle or radio handoff.

In both 3G and 4G networks, the radio connection between the user device and the radio base station is controlled by the Radio Resource Controller, or RRC. The RRC operates in the manner of a state machine, where there are several allowed states, with transitions from one state to another controlled by the RRC. These RRC state machine transitions are accompanied by fixed latency intervals, which will adversely affect data transport if not recognized and managed. The operation of the RRC impacts latency, bandwidth, signal strength, user device battery life, and overall transmission scheduling. These in turn affect throughput, packet loss, and the efficiency and operation of conventional TCP. Any transport acceleration methodology should recognize RRC behavior and operate in a manner that is synergistic with RRC operation.

Cellular Devices with Small Receive Buffers

From the perspective of a TCP sender outside the cellular network, a particular end user device may appear to have a small TCP receive buffer size, which would limit the transport rate at which content could be sent by the TCP sender. This could be due either to the fact that the user device is old and has a true hardware memory limitation, or because the TCP receiver in the device has been configured to send a small advertised window size in order to purposely slow transport rate. In either case, conventional TCP implementations will not be able to exceed a certain transport rate.

Bursty HTTP Traffic

In addition to the factors specific to the cellular network, HTTP traffic in general is bursty by nature, as is the resulting responses to the GET requests sent by end users' devices in accessing web sites. In response to the first HTTP GET command, the web server transmits the initial root object as a burst of data. Because receipt of the initial root object is a prerequisite to the end user browser or app for further processing, third ($3^{rd}$) party link fetching and page rendering, it is advantageous to deliver that object as quickly as possible so that these processes are able to start. Any traffic shaping or buffering of the root object will only delay the processing and rendering of the web page. Therefore, DOTS has been designed to maintain the original bursty profile of the root object transport. Likewise, all following objects are transported in bursts, rather than being traffic-shaped into flatter flows.

Buffer Bloat

A significant contributor to latency is the use of large memory buffers in servers and devices in the data path. Paradoxically, the use of large packet buffers has a detrimental effect on the performance of TCP, leading to degraded performance because of increased queuing delay, as shown in FIG. 1. When large buffers remain full, now described as "buffer bloat", TCP will be adversely affected leading to large latencies. The intent of device and network designers in using liberal amounts of memory was to prevent packet loss in overloaded networks. Standard TCP congestion control algorithms keep buffers full at bottleneck links, and the congestion control algorithms do not operate well in these environments because notification of packet drops (the indicator of congestion for these protocols), are delayed due to the large amount of buffering that occurs.

The existence of these large buffers has become an additional obstacle for the efficient transport of web content to mobile users.

Most of the widely deployed TCP implementations use loss-based congestion control, where the TCP sender will not slow down its sending rate until the TCP sender senses packet loss. The original design of TCP, and the dozen or so conventional variants of TCP are all based on the assumption that either packet loss or delay is able to be used as a measure of congestion with the receiver sending ACKs to acknowledge receipt of packets. With the existence of very large buffers in the cellular network, TCP senders do not have available to them the usual packet loss or delay signals that are required for proper TCP operation. In the environment, the TCP sender is not properly sensing congestion, and sends packets at an incorrect or non-optimal rate, with the result that the full bandwidth available for data transport is not utilized efficiently.

Because packet loss is either prevented by the large buffers, or packet loss is concealed through the operation of link-layer retransmissions in the cellular network, the TCP sender receives fewer indications of packet loss and will continue to increase its sending rate. This will result in nearly filling most of the buffer space, largely increasing the total RTT, or Round Trip Time experienced by the TCP flow, and thereby dramatically reducing the efficiency of data flow.

Many smart phone manufacturers have compensated for this buffer bloat factor by setting a small value for the smart phone's "advertised TCP maximum receive buffer" size, even though the actual physical buffer size in the phone may be much larger. The advertised receive window cannot be larger than the receive buffer size, and the TCP sender cannot send more data than allowed by the advertised receive window, so the TCP congestion window is limited. However, this will limit the throughput to the device and unnecessarily degrade the transmission rate. TCP is again not able to operate at the maximum efficiency possible. A new TCP implementation designed to optimize and accelerate content flow through a cellular network should address these factors.

Performance Enhancing Proxies

Some cellular network operators have inserted performance enhancing proxies (PEPs) into their networks as a means to control and traffic shape bursty incoming flows, or to act as transparent caches. These PEPs terminate the TCP sessions of origin senders (websites) and buffer traffic for retransmission towards the end user device. These PEPs are transparent, in that the senders cannot distinguish the PEP from the end user device and accept and acknowledge all data regardless of data rate or burstiness, masking the end user device characteristics from the TCP sender. The masking effect is able to limit the efficiency of conventional TCP and the visibility of the end user device characteristics. The masking effect also adds complexity to the design and operation challenges of an adaptive and optimized TCP. The PEPs are able to adversely affect the transport rate of content if they invoke traffic shaping and flow control of the incoming content stream.

Network Bandwidth Asymmetry

Another common characteristic of cellular networks is the asymmetric bandwidth distribution of the uplink versus the downlink directions. Conventional TCP congestion control algorithms provide throughput that is not only a function of the link and the traffic characteristics in the direction of data transfer. Studies have demonstrated that link and traffic characteristics in the reverse direction have a significant effect on forward direction throughput. This is because existing TCP implementations are ACK-clocked, and the total bandwidth available in the reverse-direction is able to be significantly lower than in the forward direction. This results in forward-direction web content traffic suffering significant degradation, with the link capacity being significantly underutilized. This then is a major contributor to inefficient data flow through cellular networks because TCP is not operating to efficiently utilize all available bandwidth. There may be significant bandwidth capacity in the cellular network that is not being utilized, but could be with the proper transport technology.

Mobile RestAPIs

The increasingly prevalent role of mobile web apps should be considered. Web apps access web sites through an access technology called RestAPIs, in addition to the conventional HTML access used by desktop applications. Some mobile apps embed HTML access within a software "shell", representing yet another type of access. Each type of access is accompanied with a particular set of performance constraints that should be considered in designing an acceleration technology for mobile users.

Dynamic Network Conditions

Cellular network conditions are dynamic and subject to rapid changes. Therefore, designing a simple static solution, such as a conventional CDN that is optimal for all cellular networks at all times is not possible. A dynamic, adaptable solution is utilized—one that quantifies present network conditions and end user device environments, and adapts accordingly in order to maintain the most optimal performance possible even while conditions change. This represents the singular challenge in developing a working solution for the acceleration of web content to mobile users.

DOTS

The primary focus of the DOTS software system is to provide adaptive end-to-end acceleration of web content to mobile users. The technology that provides the acceleration does so in a manner that is aware of end user apps, adapts to changing conditions in the mobile network data path and the client device, and takes action to optimize content delivery by adaptively managing data streams. Coincidentally, the DOTS Software system also provides adaptive end-to-end acceleration to non-mobile devices with the use of the same technology. Because the technology is adaptive, it senses the different conditions and environment of a wired network also, and similarly accelerates transport.

In some embodiments, the system adaptively optimizes every end user session from end-to-end without requiring any additional software to be installed on the end user device. This configuration accelerates the transport of web content to the mobile device, but does not accelerate data traffic in the reverse direction. In another configuration of the system, RMP, transport of content and data is accelerated symmetrically, meaning both from the origin (web server) towards the mobile device, and from the mobile device towards the origin. However, this functionality involves the mobile device hosting one of several versions of client software in the form of a software SDK library that a third-party app is compiled with, or a software client application.

The rapid delivery of data to mobile devices is extremely challenging, where latency in the so-called last mile is able to range from 50 milliseconds to several seconds or more, depending on network conditions and has wide variability. The latency is additive to the latency that exists in the first mile and the middle mile of the transport sequence.

The system also provides content optimization and edge caching in a manner similar to traditional CDNs, but with the intent of providing a platform that not only decreases the required number of round trips through the wired network, but also serves as a sensing and data gathering platform for the real time tuning and adaptation for its mobile network transport acceleration function and content optimization functions. With the characteristics of mobile networks changing very rapidly on a real time basis, a fixed network transport solution is unlikely to be appropriate even seconds after that particular solution performed well. Consequently, the software utilizes real time sensing of network conditions with the use of Real User Measurements (RUM) in order to provide data necessary to generate real time fine tuning of transport behavior for these rapidly changing network conditions.

The DOTS Software collects the data from the combined wired and cellular network segments to identify and tune approaches for accelerated content transport and web content optimization strategies. Data is gathered from real world networks, both wired and cellular, in real time, and from network emulation sessions in the software internal network.

First, the overall network behavior is characterized which includes the targeted collection of network performance data, as the network exists in its present state. The system should efficiently, accurately, and in a repeatable fashion, collect raw network and client device performance data that exists in four separate categories:

By wireless network type: Examples include LTE, 3G, GPRS, WiFi.

By carrier: Examples include Comcast, AT&T, Verizon, T-Mobile, Sprint.

By geography: Examples include cities in the U.S., Europe, Asia.

By client type: Examples include device operating system, browser type, PC, Smartphone, tablet.

The DOTS Software system adapts to the characteristics of the cellular network environment in real time, so the most optimal performance strategies are able to be used.

The system has a data transmission technology that compensates for the adverse effects of buffer bloat commonly seen in cellular networks, and the asymmetric bandwidth link pathways of cellular networks along with several other unique characteristics of the cellular network. With the use of the technology, the system is able to take advantage of otherwise unused bandwidth in the cellular network and accelerate data transmission without negatively impacting other data.

Web performance has become more critical than ever, primarily due to the personalization of content, making the content non-cacheable, and also the vastly growing amount of mobile access. Current optimization techniques are static and one-size-fits-all. Optimization tools also tend to be layer specific—presentation layer (Front End Optimizer, or FEO), transport layer (CDN, TCP Optimizers).

DOTS System Architecture

DOTS exists in a larger system (the Software System), which is cloud based, with Points of Presence (POPs) distributed in many domestic and international locations. The overall architecture is similar to that of a conventional CDN, except that the Software System targets mobile users and has a last-mile transport acceleration component. The CDN type architecture is one that provides the infrastructure for the operation of the DOTS system. The overall Software System is described here to provide context for the DOTS component.

In some embodiments, all software servers (or dedicated or specified servers) are connected to each other with redundant, high speed data pathways in a segment of a software cloud referred to as the "middle mile." The POPs are positioned such that they are geographically close to customer origin sites, end user locations, or both. Software servers that are in POPs close to the customer origin server, function as "content optimizers." The portion of the network pathway from the customer origin to the software content optimizer is called the "first mile." The content optimizer servers act to analyze web traffic that is sent by the customer origin server in response to an end user browser's request. The content is then optimized for more rapid and efficient transport to the end user through the execution of front end optimizations such as image compression, re-sequencing of web page objects, Java Script and CSS optimization.

After in-line processing the requested content is then forwarded by the content optimizer to a software "browser proxy" that is geographically situated in close proximity to the end user. The primary purpose of the browser proxy is to collect and forward all content to the end user device, while at the same time providing a single, unified pathway for all traffic to and from the end user device. The browser proxy functions to consolidate and coordinate all content, forwarding the content via DOTS to the end user device in the most expeditious manner possible, rather than having content flow through various pathways to the end user device, without coordination or acceleration.

The pathway between the content optimizer and the browser proxy is termed the "middle mile." After receipt of the content, the browser proxy determines whether any content is cacheable, and generates cache entries for those objects that are found to be cacheable. Additionally, any third party content is recognized, and requests for that content are sent from the browser proxy to the corresponding third parties. Content in response to these third party requests is sent back through the browser proxy (where the content is also potentially cached for future use) and delivered via DOTS' accelerated transport protocol, along with other non-3rd party content, to the end user device.

With the appropriate amount of content, the browser proxy forwards the content to the end user device in what is termed the "last mile" portion of the network.

The Software System has a policy engine and network transport optimization software that in some embodiments combines real-time session data with the ability to apply optimizations holistically in real time and on a session-specific basis—dynamically at the start of the session and adaptively during the session. Such in-session adjustments can be important for mobile access as latency and congestion are able to vary dramatically over time, and the ability to react appropriately to these changing conditions is important for accelerating transport and maintaining an acceptable user experience.

The Software System is an adaptive, policy based content and network optimizer that facilitates better web user experience and network bandwidth utilization from the provider perspective. The policies, generated and managed by the policy engine, are based on the content, network and end-user device awareness. The policies are not only configurable, but also updated dynamically based on the performance of the Software System at the session granularity level, making the changes actionable to facilitate dynamic optimization. A distributed architecture model is used to facilitate scaling, optimal compute and network resource utilization, isolation in a shared environment and reliability. In addition, the system is able to handle security attacks in a graceful manner.

Web content acceleration performance in general has become more complex and difficult due to the increasing personalization of content, making much of the content non-cacheable. Current content optimization techniques are generally static and one-size-fits-all. Optimization tools also tend to be layer specific—presentation layer (FEO, or front end optimization), server response (back end response) and transport layer (CDN, TCP Optimizers). The software approach is also organized in layers. One layer provides in-line content optimization of content that includes such functions as image compression, rewriting Java script to remove white space, combine java scripts, rewrite and combine CSS files, combine CSS elements, lazyload images.

A policy engine manages the combination of real-time session data with the ability to apply optimizations holistically and on a session-specific basis; dynamically at the start of the session and adaptively during the session. In-session adjustments are especially important for mobile access as latency and congestion is able to change a lot, and the ability to react to these changing conditions is important for maintaining an acceptable user experience.

Providing performance data to quantify the user experience is an important component of the Software System. In addition to providing performance data to the customer, RUM (Real User Measurements) data is used by the policy controller to adjust and adapt session configuration and content optimization strategies to changing network and use characteristics. As customer content passes through the content optimizer servers, small, tight Java Scripts are "injected" into the content that provide timing information that is collected and analyzed by the system while serving the web pages to the end user. The Javascript files execute in the end user's browser and collect information from the browser reflecting the timing definitions of the W3C's NavTiming API. The page load timings and network characteristics are sent to a web service, the RUM Aggregator, which accumulates data in a database for offline analysis. The specific data collected includes network performance, network latency, web site response times, page load times, and other related data. Some of the data is used for optimization within the content optimizer. The data is also used to compute the ROI and report generation for customers and for internal consumption. With the collection of the data, the Policy Manager is able to adapt the content optimization and transport mechanisms to the changing conditions typical of mobile environments. The proactive tester is the framework that provides the RUM synthetic testing mechanism.

DOTS Transport Technology

Even when web content is able to be delivered from a content distribution network's edge server, typically within 10 milliseconds from a "wired" end-user, the mobile "last mile" is able to add 50 milliseconds to several seconds of latency. Even a latency of 50 milliseconds adds the equivalent delay of that seen in sending content from LA to NY.

Therefore even with a content distribution network that moves content to the network edge, the total content delivery time through a cellular network is able to remain very high. Therefore, a new generation of transport technology is able to bridge the gap of the mobile network.

Two specialized data transport protocols and congestion control mechanism/algorithms have been developed to accelerate the delivery of web content in the last mile for both mobile and wired networks. One protocol, DOTS, is TCP based, and transports content in a unidirectional manner from the Software System to the end user and does not require any additional software in the end user device. The other protocol, RMP, is both UDP and TCP based and transports content bi-directionally between the system and the end user; the protocol utilizes additional software in the end user device.

DOTS is a specialized TCP compatible protocol that has been purposely built to accelerate web content in a unidirectional manner over the last mile segment of the network. DOTS is designed to be adaptable to the changing conditions present in cellular networks while also accelerating transport of web content over wired networks which typically have lower rates of change than cellular networks. The transport protocol, utilizing the latest advances in modern network queuing theory and communications protocol design, is designed to be compatible with the operation of conventional TCP implementations. Because of this, DOTS resides in a server node near the network edge and transports content over the last mile, either mobile or wired, with that content received by a conventional TCP instance in the end user device.

By applying any previous experience with the particular end user IP address, prior network traffic conditions, cellular network type, cellular operator identity, device type, DOTS learns, adapts and modifies its configuration and operation to maximize the throughput to the mobile or wired end user device. DOTS will configure itself appropriately for each transmission on a session by session basis, so if network conditions have changed, DOTS will respond and act accordingly. DOTS will accelerate web content to the maximum rate consistent with present network conditions and end user device capabilities. With the next access by the end user, DOTS will apply the configuration it has learned is best for that end user device and network as a starting point so that the transport acceleration DOTS provides has already benefited from any prior experience. While transporting content, DOTS continually adjusts itself to changing conditions on the fly, maximizing its performance while sensing any limiting conditions that utilize real time modification of DOTS behavior. DOTS will then store relevant session data relating to connection conditions and make that information available for any subsequent DOTS session by that end user.

DOTS will adapt to real time conditions and implement a specific behavior and optimize its configuration by having an adaptable initial congestion window, slow start threshold values, adaptable congestion control algorithms, selectable pacing levels, and traffic contour enhancements. Since DOTS is able to adapt and configure itself, DOTS is able to maintain a time-averaged behavior that is consistent with conventional TCP network expectations of traffic fairness.

DOTS operates in a manner that allows unused bandwidth to be utilized for web content delivery. In cellular networks, a common network condition is bandwidth asymmetry between the downlink and uplink directions, which slows transport rate of conventional TCP implementations. This condition is sometimes caused by buffer bloat, which itself is a major contributor to underutilized bandwidth capacity in the network. Instead of utilizing ACK-clocking to regulate its data flow rates as do conventional TCP implementations, DOTS utilizes a pacing algorithm called RBE (Bandwidth Estimator) that is not adversely affected by either asymmetrical bandwidth link characteristics or buffer bloat. The approach has proven to provide a significant improvement in bandwidth utilization in asymmetric link environments and buffer bloat conditions common in cellular networks and some wired networks. DOTS also utilizes leaky bucket flow management algorithms to control the pacing of packet transmissions in the absence of reliable RTT data.

Transport technology is focused on the optimization and acceleration of HTTP web traffic. Typically, an HTTP GET command, issued by the end user's browser, results in an HTTP response from the server that first includes the root object. Only after receipt of the root object will the user's browser be able to begin executing and rendering the requested web site content; this represents a bottleneck or critical path item. DOTS is designed to maintain the burst character of the root object response so that the end user device receives the root object in the fastest time possible. DOTS invokes an initial flow burst that is not moderated by a conventional TCP slow start algorithm, instead driving the initial object at the maximum rate that is able to be supported by the network and the end user device. The duration of the initial burst phase is controlled by a leaky bucket algorithm, so that once the root object is transferred, DOTS enters a modified congestion avoidance mode controlling the transport rate with input from RBE as described above.

With the existence of a Performance Enhancing Proxy (PEP) in the data path, conventional TCP algorithms are unable to generate an end to end connection between the website server and the end user device, thereby being subject to any traffic shaping or flow control behavior imposed by the proxy. In the presence of PEP's traffic shaping and flow control effect, both DOTS and RMP transport technology have the ability to sometimes bypass these PEP devices and thereby establish a higher flow rate to the end user device without being subject to PEP-mediated traffic shaping or flow control.

While the common condition of buffer bloat in cellular networks slows content flow managed by conventional TCP implementations, DOTS is not materially affected by buffer bloat, and content will still be accelerated.

DOTS overcomes problems compounded by the small value for the smart phone's TCP maximum receive buffer size, the asymmetric link pathways of cellular networks, along with several other unique characteristics of the cellular network. With the use of the technology described herein, software is able to take advantage of the unused bandwidth in the cellular network, and accelerate data transmission without negatively impacting other data.

With the addition of the SDK and the RMP, the system will monitor the end user device and the radio state, including battery status, signal strength, cellular network type, and the Radio Resource Controller state machine. Using the radio data, the system will be able to predict changing MAC latencies and optimize content flow more efficiently.

Because of the highly dynamic environment of cellular networks, DOTS has the ability to adapt to these changing conditions in real time. DOTS also stores relevant session data concerning network and device characteristics, which allows DOTS to apply that experience to the same network environment by initializing the start of the new session with parameters of the most optimal values as retrieved from the prior session record. FIG. 2 shows DOTS functions addressing adverse network and device conditions.

Transport Technology Performance

While the transport technology is specifically designed to accelerate content transport through the cellular network, and indeed achieves significant content acceleration through the cellular network, the transport technology also provides significant acceleration through non-cellular, wired networks where the last mile may include DSL, DOCSIS cable, or fiber optics.

Figure 3:
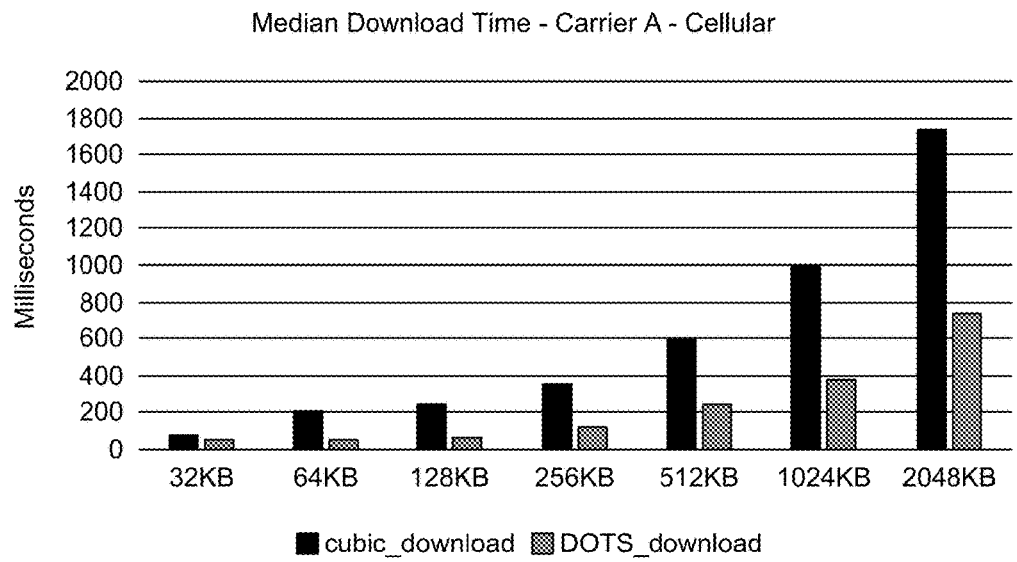
FIG. 3 illustrates a graph of median download time through a cellular network.
Figure 4:
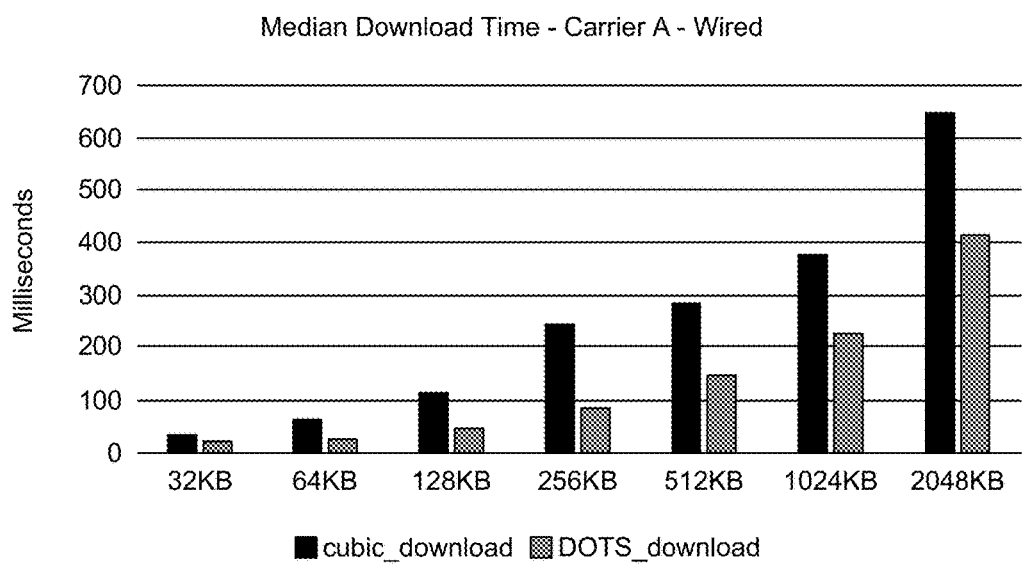
FIG. 4 illustrates a graph of median download time through a wired network.

FIGS. 3 and 4 chart the relative performance of DOTS vs. conventional TCP. FIG. 3 graphs the download time of data objects of various sizes through a typical cellular network. FIG. 4 graphs the download time of data objects of various sizes through a typical wired network. Similar gains are seen through the networks of other carriers, such as AT&T.

DOTS Description

A DOTS version of the TCP congestion control mechanism is described. TCP DOTS utilizes a combination of methods to manage the congestion window (CWND) that are specific to cellular networks, and optimized specifically for the rapid transport of HTTP messages. Throughout this description, examples of metrics that are able to be used to determine the initial CWND are described. It should be apparent to those skilled in the art that more or less metrics are able to be used to make this determination of the initial CWND.

In all that follows, the focus is on cellular networks which have distinctly different network characteristics than wired, being more dynamic and variable than wired (the original target of TCP design), and therefore utilizes a more dynamic approach to the conventional TCP mechanisms such as initial and current congestion window sizing, slow start algorithm.

DOTS is based on targeted modifications of the Westwood TCP code. The main functionality of Westwood and DOTS is to estimate the bandwidth and calculate how many packets are able to be sent out on the wire given the current conditions. There is a subtle difference between the formulae used by each:

Westwood: #pkts=(BWe*RTTmin)/MSS
DOTS: #pkts=(BWe*RTT)/MSS

Westwood is conservative in its calculation and uses the smallest RTT ever seen on the connection. DOTS on the other hand uses the last RTT measurement and is able to therefore determine that the connection is able to handle more packets. At no point will the DOTS calculation be less than the Westwood calculation.

The calculation comes into play when a connection experiences congestion or packet loss. In both cases, Westwood uses the formula above to set the slow start threshold, ssthresh. The threshold is used to reset the congestion window, CWND, once it has recovered from the congestion event or packet loss. In the case of congestion, DOTS sets ssthresh to whichever is greater, the value calculated using the formula above or 90% of the current CWND. In the case of packet loss, DOTS sets the ssthresh to whichever is greater, the value calculated using the formula or 75% of the current CWND.

When the connection is in the congestion avoidance state (steady state) and out of the slow start phase, Westwood increases the CWND at the same rate as that used in TCP Reno, a TCP congestion-avoidance algorithm. The CWND is incremented by 1 when a window's worth of ACKs is received. For example, if the CWND is 20, the connection should receive 20 ACKs before the CWND is increased to 21. DOTS uses the same algorithm used by Cubic to grow the CWND. The algorithm allows DOTS to increase the CWND more aggressively while the current value is less than the calculated maximum. A difference between the DOTS version of the algorithm and Cubic's algorithm is that Cubic updates a delayed ACK variable every time an ACK is received. This controls how fast or slow the CWND is increased. The DOTS version of the algorithm does not update the delayed Ack value.

DOTS Initial Congestion Window

The initial congestion window used by TCP dictates how many packets are able to be transmitted to a client in the initial burst of data. Standard Linux TCP currently uses 10. This, with a standard maximum segment size (MSS) of 1460 limits the initial burst of data to a client to 14,600 bytes. On top of this, the congestion window growth is slow, as standard TCP utilizes a slow start algorithm where the congestion window is increased by 1 for every ACK received. All of these combined results in sub-optimal initial bandwidth utilization on data objects>14 KB. As an example, given a data object of 64 KB, the complete object will be transmitted to the client long before standard TCP grows the congestion window enough to make full use of the available bandwidth.

DOTS does not use a fixed initial congestion window. Each client is different. They run on variety of operating systems, browsers, networks with different network conditions. So a single, fixed initial congestion window does not provide optimum bandwidth for all clients. Therefore, DOTS uses the client data to determine what the initial congestion window should be. First, DOTS looks at the advertised receive window in the client's ACK packet of the three-way TCP handshake and determines if the window is a small (<64 KB), medium (>=64 KB & <128 KB) or large (>=128 KB) window. The classification determines the multiplier used to set a new receive window for client: 3 for small, 2 for medium and 1 for large. Secondly, DOTS divides the new receiver window by the agreed upon MSS. For a window size of 16K, the initial congestion window will be 16,384*3/1460=33. A congestion window of this size will allow the server to transmit data objects up to 47 KB in size during the initial burst. While the use of three window classifications is described here, the system described herein includes the possibility of using more than three classifications.

There are times when a client advertises a receiver window that it truly cannot handle. In this scenario, a larger initial congestion window could actually cause congestion or packet loss. If this does occur, the session database is updated with the appropriate information so that the initial congestion window is not so aggressive in the future for the given client.

DOTS Learning Machine—Session Database

The DOTS Session database is used by DOTS to maintain metrics about all active and past DOTS connections. The data is used to determine how well DOTS is working, which clients have experienced problems with the DOTS and to what degree.

The database is comprised of two types of records. First is the session record. Every active TCP connection to the server has a session record, which the client's IP address and port number uniquely identify. The record is used to record the latency and bandwidth measurements as calculated by the DOTS. Second is the client record, which is a summary of past connections from a particular IP address. DOTS maintains a history of the total packets sent, total retransmissions, bandwidth (low, high and last), latency (low, high and last) and back-off level. These values are maintained for three TCP receiver window sizes: small (less than 64 KB), medium (between 64 KB and 128 KB) and large (greater than 128 KB). While the use of three TCP window size values is used here, the system described herein includes the possibility of maintaining more than three values.

The generation of session and client records occurs within the DOTS stack interrupt handler, which means no blocking operations are permitted. Therefore, the memory for new records should be pre-allocated. In order to not consume more memory than necessary, records are allocated in blocks of 300. As these records are utilized, it is possible that the number of available "free" records will drop below an acceptable threshold (currently one third of the original block size). If and when this occurs, a new block will be allocated. In some embodiments, there is no limit on the number of blocks that are able to be allocated. The reason being that session records are returned to the "free" pool once the connection is closed and client records are limited to the number of unique IP addresses that have connected to the server. If these reasons fail to hold true in the future, an algorithm will be utilized to reclaim old client records and ensure the system memory is not exhausted.

The DOTS session database provides APIs to generate new records, update measurement data within session records, and retrieve client data from within the kernel and from the application layer. The database does not provide APIs to generate or edit client records as this is managed completely within the database.

DOTS Flow Rate Control and Congestion Control

DOTS is able to be considered somewhat aggressive with regards to data transfer rates. DOTS does attempt to maximize the transfer rate for all clients but at a rate that is proportional to the client's advertised receive window. However, not every client is able to successfully handle the higher transfer rate. This is able to result in failed transfers, connection resets, excessive packet retransmission, and longer transfer times. The congestion control learning machine functionality is a means to help prevent these issues on future connections from a particular client (IP address). Congestion control learning machine analyzes various TCP metrics as a connection is closing and determines whether or not future connections should back off in the level of aggressiveness. When a new connection is established, DOTS will query the session database for the client's back-off level. If the connection has never experienced any issues then there is no back-off level. Otherwise a back-off level is given based on the severity of the issues seen on past connections. The back-off level indicates the extent to which DOTS is able to manipulate the client's advertised receive window (ARW) and the initial congestion window (ICW).

In some embodiments, the congestion control learning machine tracks how many packets were transmitted for a connection and how many packets are to be retransmitted and uses the data to determine the back-off level. In order to give the appropriate weighting to connections that experienced issues, any connection that successfully transmits all of its data without a single retransmission is not used to determine the back-off level. The congestion control learning machine calculates the retransmission percentage and uses that as the back-off level. For example, if a connection experiences less than 10% retransmission, its back-off level is 0. If a connection experiences between 10% and 19% retransmission rate, then its back-off level is 1 and so on.

As previously mentioned, DOTS manipulates the ARW and ICW. DOTS applies a multiplier to the ARW based upon its original value. If the ARW is less than 64 KB, then it is multiplied by 3. If the ARW is between 64 KB and 128 KB, the multiplier is 2. For any ARW larger than 128 KB, the multiplier is 1. The ICW is determined by dividing the new ARW by the MSS (normally 1448). If necessary, the ICW is capped at 60. With the congestion control learning machine, DOTS will alter its manipulation based on the back-off level. For any back-off level other than 0, the ARW multiplier will be 1, and the calculated ICW is divided by the back-off level and has a minimum threshold of 10. For example, if the ARW is 14 KB, and the back-off level is 0, then the new ARW is 42 Kb, and the ICW is 29. If the ARW is 14 KB and the back-off level is 2 then the new ARW is 14 KB and ICW is 14.

Implementation

The DOTS Session Database should be lightweight, fast and not a CPU hog. In order to accomplish these goals, the foundation for the database is able to be either a double linked list or a hash table. In Linux, the hash table and standard list implementations are very similar but from a speed point of view, the hash table is slightly better. The standard list is a double linked list whereas the hash table is a single linked list, meaning one less pointer update on every addition/deletion from the list. For the purpose of the session table, this is able to be a large CPU savings, as records are added and deleted from the table as often as connections are opened and closed. Another factor affecting speed is how quickly searches for specific clients are able to be completed. Extremely fast search capability could be accomplished if a single layer hash table is used, and the client's IP address is used as the hash key. This would result in a quick index into the hash table to look up any client requiring no hash function or data comparison. However, this would include the ability to store one client record for every possible IP address or 4,294,967,296 records plus additional records for any active connection (session). The memory usage for the implementation is significant, especially when most of the memory would never be used: 588,514,304 records never used as they correspond to reserved IP addresses, and it is unlikely that every other IP address would initiate a connection to each and every server (or a specified set of servers). A two layer hash table and hash function are used to reduce the memory usage and still provide quick searching. In some embodiments, the hash function is the hash_32( )function in standard Linux, and the hash_320( )function will be used in conjunction with the two most significant octets in the client's IP address. This reduces the number of records at startup to 65536 records. As more and more clients connect to the server, this number will grow, but it will get nowhere near the number of records in the single layered solution. This will also allow the session database to group client information according to their service provider.

Figure 5:
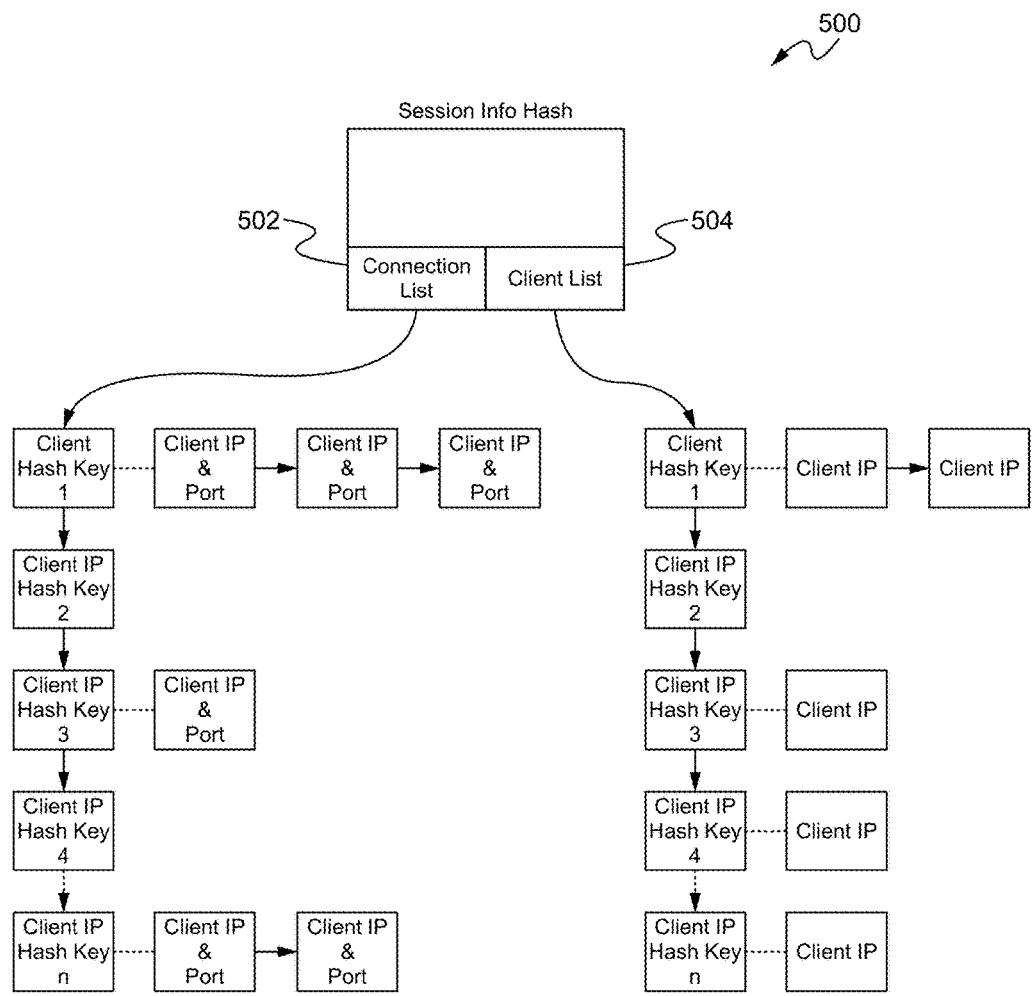
FIG. 5 illustrates a diagram of session information hash tables according to some embodiments.

FIG. 5 illustrates the connection and client hash tables as maintained within the database. A session information hash table 500 includes a connection list 502 and a client list 504. The connection list 502 includes client hash keys, and for each client hash key, there is an associated client IP address and port number. The client list 504 includes client hash keys with an associated client IP address. Another hash table is used within the session database. It is a single layer hash table that does not use a hash key to quickly reference entries. The table is used to maintain a list of all allocated records that are not currently in use. The table could be maintained as a list instead of a hash table, but in order to simplify the moving of records from one table to the next, a hash is used.

Figure 6:
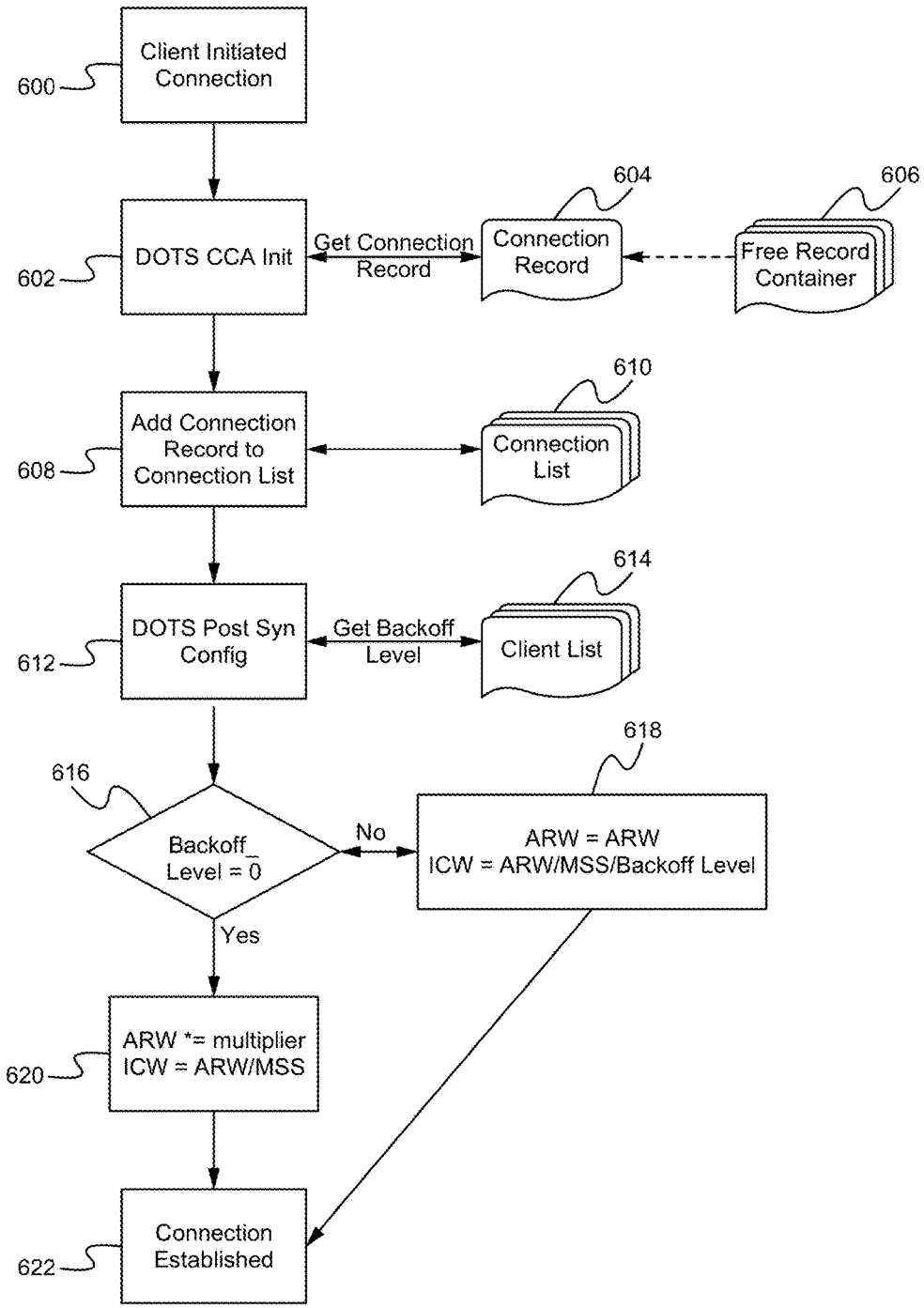
FIG. 6 illustrates a diagram of establishing connection logic according to some embodiments.

FIG. 6 illustrates the processing logic that is executed when a client initiates a new connection with the server. FIG. 6 shows how a new connection obtains a connection record, moving a record from the Free Container to the Connection List, how the existing client records are used to get the back-off level for the current client and how the new ARW and ICW are calculated.

In the step 600, a connection is initiated by a client. In the step 602, the DOTS CCA Init is executed which gets a connection record 604 from the Free Record Container 606. In the step 608, the new connection record is added to the Connection List 610. In the step 612, the DOTS Post SYN Configuration function (POST SYN Config) is executed which requests the back-off level for the current client from the Client List 614. In the step 616, it is determined if the back-off level is equal to 0. If it is determined that the back-off is not equal to 0, then in the step 618, the advertised receive window (ARW) is left unchanged and the initial congestion window (ICW) is calculated by dividing the ARW by the current maximum segment size (MSS) and then dividing the result by the back-off level (ICW=ARW/MSS/Backoff Level). If it is determined that the back-off level is equal to 0, then in the step 620, the ARW is multiplied by the determined multiplier and the ICW is calculated by dividing the new ARW by the current MSS (ARW*=Multiplier & ICW=ARW/MSS). In the step 622, the connection is marked as Established.

Figure 7:
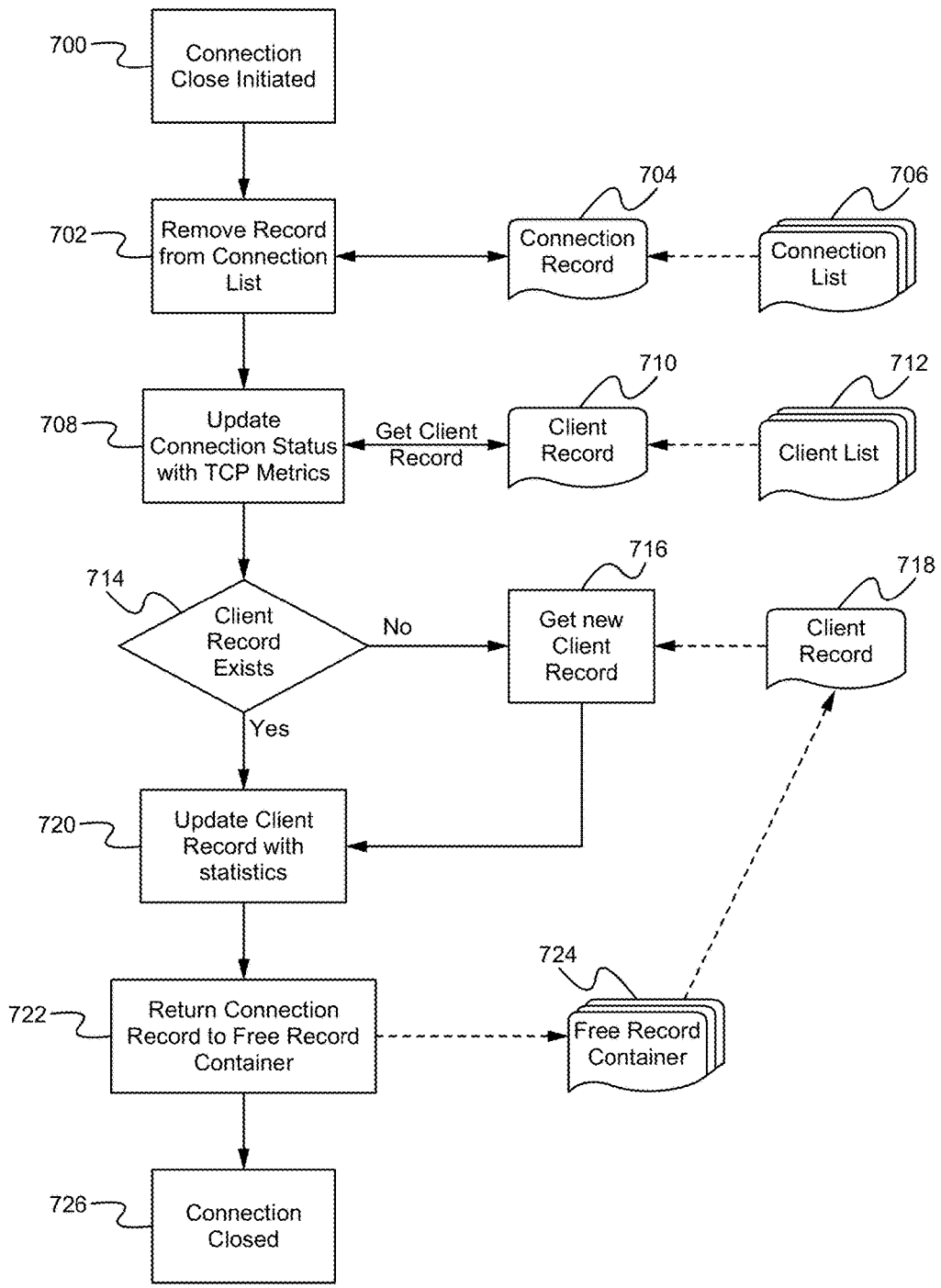
FIG. 7 illustrates a diagram of closing connection logic according to some embodiments.

FIG. 7 illustrates the processing executed when a client-initiated connection is being closed. FIG. 7 shows how the connection record is removed from the Connection List, how the connection metrics are updated in the corresponding client record (new record created if necessary) and how the connection record is returned to the Free Record Container.

In the step 700, a connection close is initiated. In the step 702, the Connection Record 704 is removed from the Connection List 706. In the step 708, the connection status is updated and a Client Record 710 is retrieved from the existing Client List 712. In the step 714, it is determined if the retrieval of the Client Record returned a valid record. If it is determined that the Client Record did not return a valid record, then at the step 716, a new Client Record 718 is retrieved from the Free Record Container 724. If it is determined that the Client Record did return a valid record, or after the new Client Record 718 is retrieved at the step 716, then at the step 720, the client record is updated with the current connection's statistics. The connection record is returned to the Free Record Container 724 in the step 722. In the step 726, the connection is closed.

Figure 8:
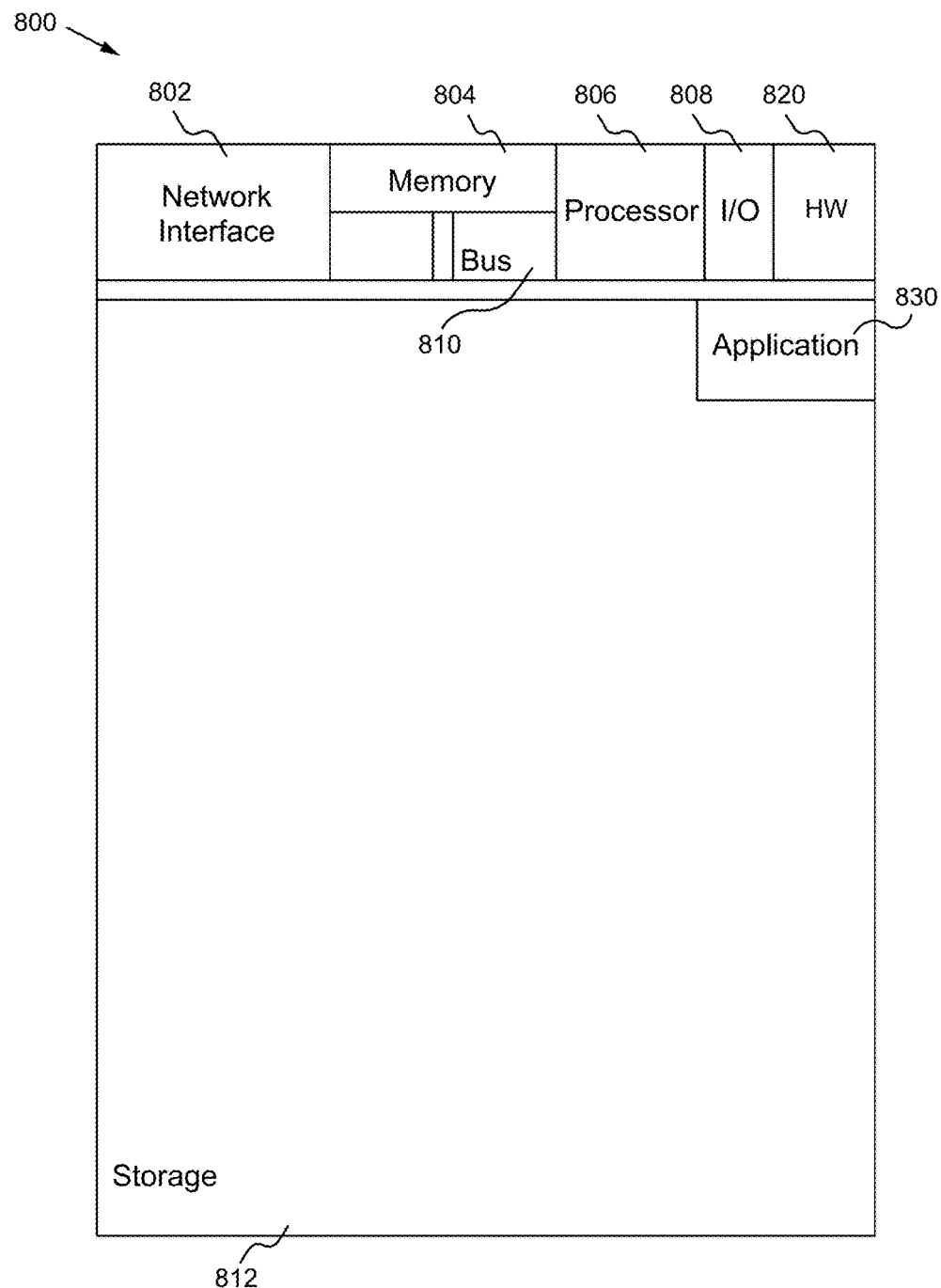
FIG. 8 illustrates a block diagram of an exemplary computing device configured to implement the DOTS method according to some embodiments.

FIG. 8 illustrates a block diagram of an exemplary computing device configured to implement the DOTS system according to some embodiments. The computing device 800 is able to be used to acquire, store, compute, process, communicate and/or display information. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, Blu-Ray®, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, display, printer, modem, touchscreen, button interface and other devices. In some embodiments, the hardware structure includes multiple processors and other hardware to perform parallel processing. DOTS system application(s) 830 used to perform the DOTS method are likely to be stored in the storage device 812 and memory 804 and processed as applications are typically processed. More or fewer components shown in FIG. 8 are able to be included in the computing device 800. In some embodiments, DOTS hardware 820 is included. Although the computing device 800 in FIG. 8 includes applications 830 and hardware 820 for implementing the DOTS method, the DOTS method is able to be implemented on a computing device in hardware, firmware, software or any combination thereof. For example, in some embodiments, the DOTS applications 830 are programmed in a memory and executed using a processor. In another example, in some embodiments, the DOTS hardware 820 is programmed hardware logic including gates specifically designed to implement the method. In some embodiments, the computing device is also able to be a virtual machine (VM) architecture.

In some embodiments, the DOTS application(s) 830 include several applications and/or modules. In some embodiments, modules include one or more sub-modules as well.

Examples of suitable computing devices for implementing the DOTS and/or the RMP as described herein, include a personal computer, a laptop computer, a computer workstation, a server, a mainframe computer, a handheld computer, a personal digital assistant, a cellular/mobile telephone (e.g. an iPhone®), a smart appliance, a smart television, a tablet computer (e.g. an iPad®), a smart watch, networking devices (e.g., a proxy device, hub, router, switch), a gaming device or any other suitable computing device.

Figure 9:
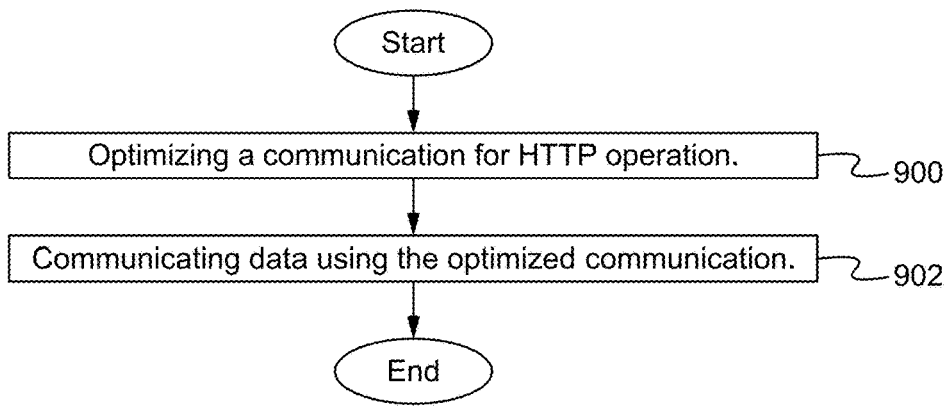
FIG. 9 illustrates flowchart of a method of executing flow control of a communications session over a network for acceleration of web content to mobile devices according to some embodiments.

FIG. 9 illustrates flowchart of a method of executing flow control of a communications session over a network for acceleration of web content to mobile devices according to some embodiments. In the step 900, a communication for HTTP operation is optimized. The communication is able to be optimized in any manner such as by allowing bursty HTTP flow characteristics. For example, burst flow behavior is utilized for root object delivery and secondary object delivery. In the step 902, data is communicated using the optimized communication. In some embodiments, fewer or additional steps are implemented. In some embodiments, the order of the steps is modified.

Figure 10:
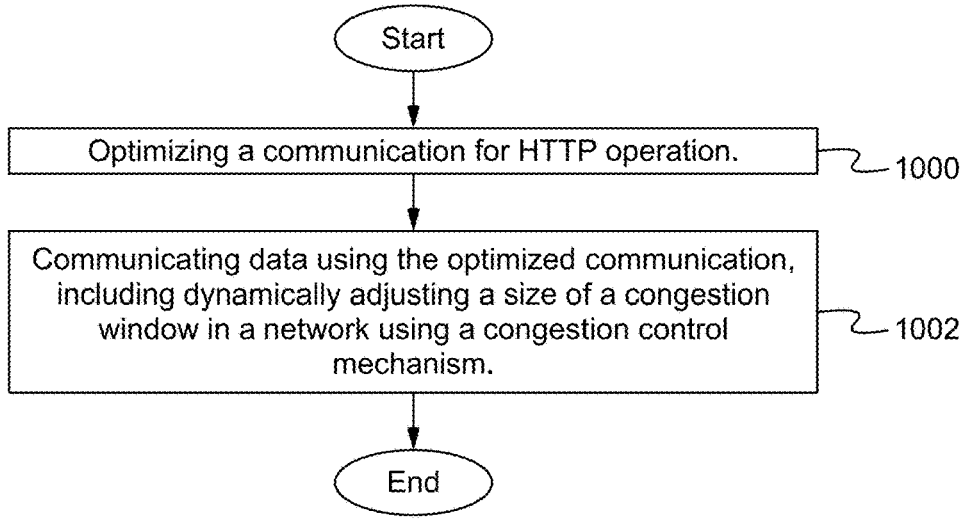
FIG. 10 illustrates a flowchart of a method of executing congestion control of a communications session over a network, for acceleration of web content to mobile devices according to some embodiments.

FIG. 10 illustrates a flowchart of a method of executing congestion control of a communications session over a network, for acceleration of web content to mobile devices according to some embodiments. In the step 1000, a communication for HTTP operation is optimized by allowing bursty HTTP flow characteristics, including dynamically adjusting a size of a congestion window in a network using a congestion control mechanism. In the step 1002, data is communicated using the optimized communication. In some embodiments, fewer or additional steps are implemented. In some embodiments, the order of the steps is modified.

Figure 11:
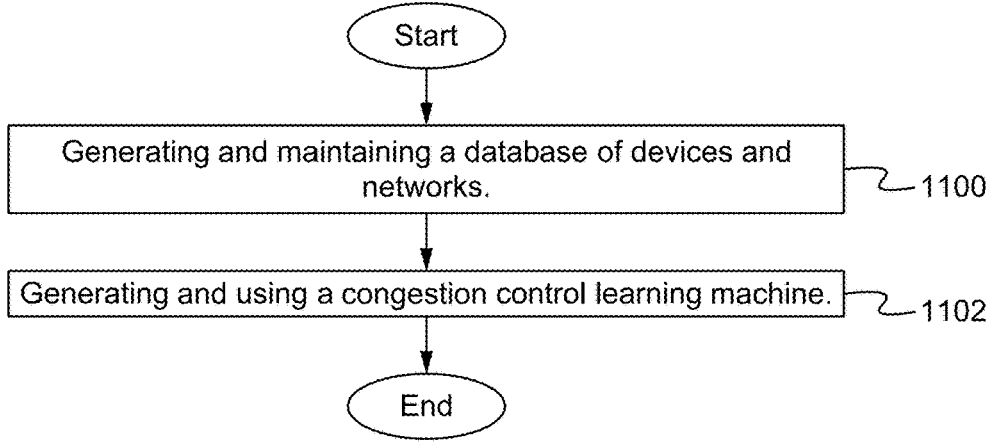
FIG. 11 illustrates a flowchart of a method of applying previous experience with a specific connection in order to set appropriate parameters governing the behavior of a TCP-type connection.

FIG. 11 illustrates a flowchart of a method of applying previous experience with a specific connection in order to set appropriate parameters governing the behavior of a TCP-type connection. In the step 1100, a session database of devices and networks that records specific device and network characteristics and performance responses in dynamically optimized transport system sessions is generated and maintained. In the step 1102, a congestion control learning machine that uses prior session records in the session database is generated and used to set a most optimal dynamically optimized transport system web content delivery flow rate to a specific mobile end user device and cellular network by analyzing the prior session records in order to derive the most optimal dynamically optimized transport system web content delivery flow rate to the specific mobile end user device and the cellular network by dynamically setting an initial congestion window and setting transport rate backoff levels to be used as a function of subsequent retransmission events. In some embodiments, fewer or additional steps are implemented. In some embodiments, the order of the steps is modified.

Figure 12:
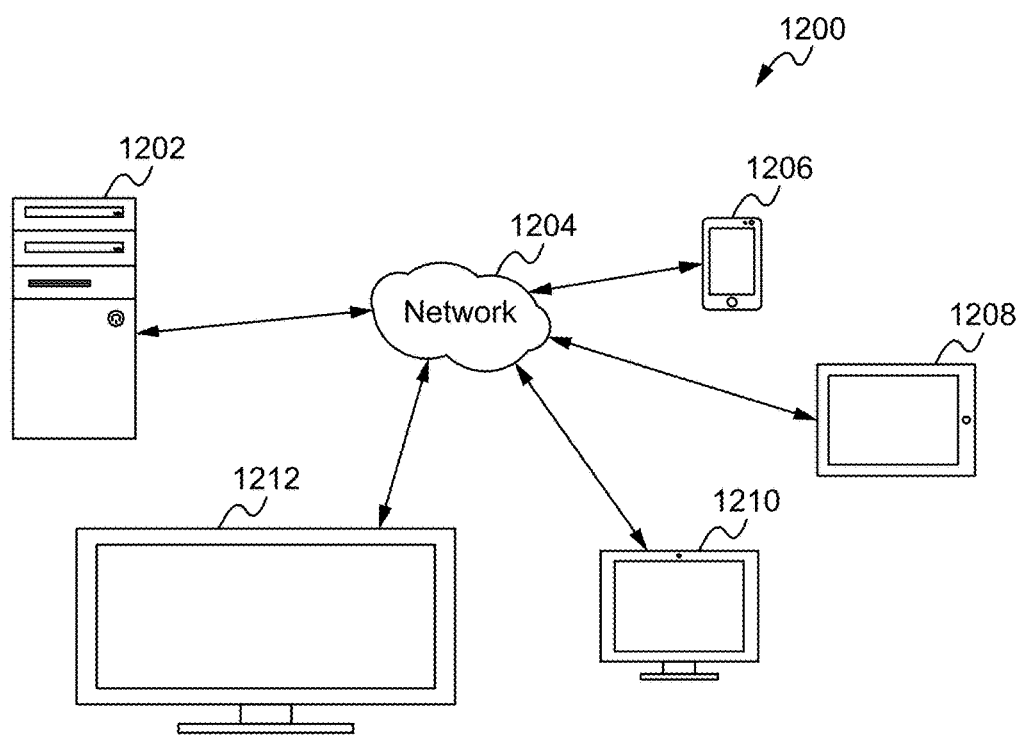
FIG. 12 illustrates a diagram of a network of devices implementing the DOTS method according to some embodiments.

FIG. 12 illustrates a diagram of a network of devices implementing the DOTS method according to some embodiments. A network of devices 1200 includes a server 1202 (or other computing device such as a proxy device), a network 1204 and one or more networked devices (e.g., a smart phone 1206, a tablet 1208, a personal computer/laptop 1210, and/or a smart television 1212). As described, the server 1202 is able to communicate with the one or more networked devices over the network 1204 in an optimized manner by implementing the DOTS method. The network 1204 is able to be any type of network such as a wired, wireless, a Local Area Network (LAN), a larger network, the Internet, a cellular network and/or any other network or type of network, and/or a combination thereof.

To utilize the DOTS method and system, an end user utilizes a device (e.g., a smart phone) as the user typically would; however, the user would be able to perform communications via a network in a much faster and more optimized manner.

In operation, the DOTS method and system accelerates the transport of data on a network. For example, a user browsing the web using a smart phone would receive web page content much more quickly by communicating using the DOTS method and system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of applying previous experience with a specific connection to set appropriate parameters governing the behavior of a TCP-type connection comprising:
   a. generating and maintaining a session database of devices and networks that records specific device and network characteristics and performance responses in dynamically optimized transport system sessions;
   b. generating and applying a congestion control learning machine that uses prior session records in the session database to set a most optimal dynamically optimized transport system web content delivery flow rate to a specific mobile end user device and cellular network by analyzing the prior session records to derive the most optimal dynamically optimized transport system web content delivery flow rate to the specific mobile end user device and the cellular network by dynamically setting an initial congestion window and setting transport rate backoff levels to be used as a function of subsequent retransmission events; and
   c. initiating a new connection with a server including obtaining a connection record, moving a record from a free container to a connection list, using existing client records to determine a back-off level for a current client and calculating a client receive window and an initial congestion window.

2. A method of applying previous experience with a specific connection to set appropriate parameters governing the behavior of a TCP-type connection comprising:
   a. generating and maintaining a session database of devices and networks that records specific device and network characteristics and performance responses in dynamically optimized transport system sessions;
   b. generating and applying a congestion control learning machine that uses prior session records in the session database to set a most optimal dynamically optimized transport system web content delivery flow rate to a specific mobile end user device and cellular network by analyzing the prior session records to derive the most optimal dynamically optimized transport system web content delivery flow rate to the specific mobile end user device and the cellular network by dynamically setting an initial congestion window and setting transport rate backoff levels to be used as a function of subsequent retransmission events; and
   c. closing a connection with a server including removing a connection record from a connection list, and if a client record already exists for the client then the connection record is returned to a free container; otherwise, the connection record is transitioned into the client record and added to the client list.

3. An apparatus comprising:
   a. a non-transitory memory for storing an application, the application configured for applying previous experience with a specific connection to set appropriate parameters governing the behavior of a TCP-type connection including:
      i. generating and maintaining a session database of devices and networks that records specific device and network characteristics and performance responses in dynamically optimized transport system sessions;
      ii. generating and applying a congestion control learning machine that uses prior session records in the session database to set a most optimal dynamically optimized transport system web content delivery flow rate to a specific mobile end user device and cellular network by analyzing the prior session records to derive the most optimal dynamically optimized transport system web content delivery flow rate to the specific mobile end user device and the cellular network by dynamically setting an initial congestion window and setting transport rate backoff levels to be used as a function of subsequent retransmission events; and
      iii. initiating a new connection with a server including obtaining a connection record, moving a record from a free container to a connection list, using existing client records to determine a back-off level for a current client and calculating a client receive window and an initial congestion window; and
   b. a processing component coupled to the memory, the processing component configured for processing the application.

4. An apparatus comprising:
   a. a non-transitory memory for storing an application, the application configured for applying previous experience with a specific connection to set appropriate parameters governing the behavior of a TCP-type connection including:

i. generating and maintaining a session database of devices and networks that records specific device and network characteristics and performance responses in dynamically optimized transport system sessions;
ii. generating and applying a congestion control learning machine that uses prior session records in the session database to set a most optimal dynamically optimized transport system web content delivery flow rate to a specific mobile end user device and cellular network by analyzing the prior session records to derive the most optimal dynamically optimized transport system web content delivery flow rate to the specific mobile end user device and the cellular network by dynamically setting an initial congestion window and setting transport rate backoff levels to be used as a function of subsequent retransmission events; and
iii. closing a connection with a server including removing a connection record from a connection list, and if a client record already exists for the client then the connection record is returned to a free container; otherwise, the connection record is transitioned into the client record and added to the client list.

* * * * *